United States Patent
Ito

(10) Patent No.: US 10,084,314 B2
(45) Date of Patent: Sep. 25, 2018

(54) STORAGE BATTERY EQUIPMENT

(71) Applicant: DENSO CORPORATION, Kariya, Aichi-pref. (JP)

(72) Inventor: Akira Ito, Nukata-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 403 days.

(21) Appl. No.: 14/874,762

(22) Filed: Oct. 5, 2015

(65) Prior Publication Data
US 2016/0126741 A1   May 5, 2016

(30) Foreign Application Priority Data

Oct. 10, 2014 (JP) ................. 2014-208778

(51) Int. Cl.
| | |
|---|---|
| *H02J 1/00* | (2006.01) |
| *H02J 3/00* | (2006.01) |
| *H02J 3/38* | (2006.01) |
| *H02J 1/10* | (2006.01) |
| *H02J 3/32* | (2006.01) |

(52) U.S. Cl.
CPC .............. *H02J 3/383* (2013.01); *H02J 1/102* (2013.01); *H02J 3/32* (2013.01); *Y02B 10/14* (2013.01); *Y02E 10/563* (2013.01); *Y02E 10/566* (2013.01); *Y02E 70/30* (2013.01); *Y02P 80/14* (2015.11)

(58) Field of Classification Search
CPC ... H02J 1/102; H02J 3/32; H02J 3/383; Y02B 10/14; Y02E 10/563; Y02E 10/566; Y02E 70/30; Y02P 80/14

USPC ........................................................... 307/82
See application file for complete search history.

(56) References Cited

U.S. PATENT DOCUMENTS

| | | | |
|---|---|---|---|
| 2009/0192655 A1 | 7/2009 | Ichikawa et al. | |
| 2010/0076825 A1 | 3/2010 | Sato et al. | |
| 2011/0133558 A1* | 6/2011 | Park ...................... | H02J 3/32 |
| | | | 307/66 |
| 2013/0024035 A1 | 1/2013 | Ito et al. | |
| 2013/0253715 A1 | 9/2013 | Cho et al. | |
| 2014/0025214 A1 | 1/2014 | Ito et al. | |
| 2014/0049109 A1* | 2/2014 | Kearns .................. | H02J 3/00 |
| | | | 307/52 |
| 2014/0176079 A1 | 6/2014 | Ito | |

FOREIGN PATENT DOCUMENTS

| | | |
|---|---|---|
| JP | 2007252175 A | 9/2007 |
| JP | 2008-054439 | 3/2008 |
| JP | 2008-067481 | 3/2008 |

(Continued)

*Primary Examiner* — Rexford Barnie
*Assistant Examiner* — Toan Vu
(74) *Attorney, Agent, or Firm* — Harness, Dickey & Pierce, P.L.C.

(57) ABSTRACT

A storage battery equipment includes a converter, a system interconnection inverter, and a controller. The converter extracts direct current power from a storage battery, then converts a voltage of the direct current power and outputs the direct current power. The system interconnection inverter converts the direct current power outputted from the converter into an alternating current power. The controller controls the system interconnection inverter such that an amount of power output from the system interconnection inverter to a load matches a preset target discharge amount.

5 Claims, 5 Drawing Sheets

(56) References Cited

FOREIGN PATENT DOCUMENTS

| | | |
|---|---|---|
| JP | 2008-141918 | 6/2008 |
| JP | 2010-081722 | 4/2010 |
| JP | 2012222860 A | 11/2012 |
| JP | 2012244759 A | 12/2012 |
| JP | 2013-027214 | 2/2013 |
| JP | 2013172514 A | 9/2013 |
| JP | 2014-023376 | 2/2014 |
| JP | 2014079076 A | 5/2014 |
| JP | 2014-128063 | 7/2014 |
| JP | 2014524099 A | 9/2014 |

\* cited by examiner

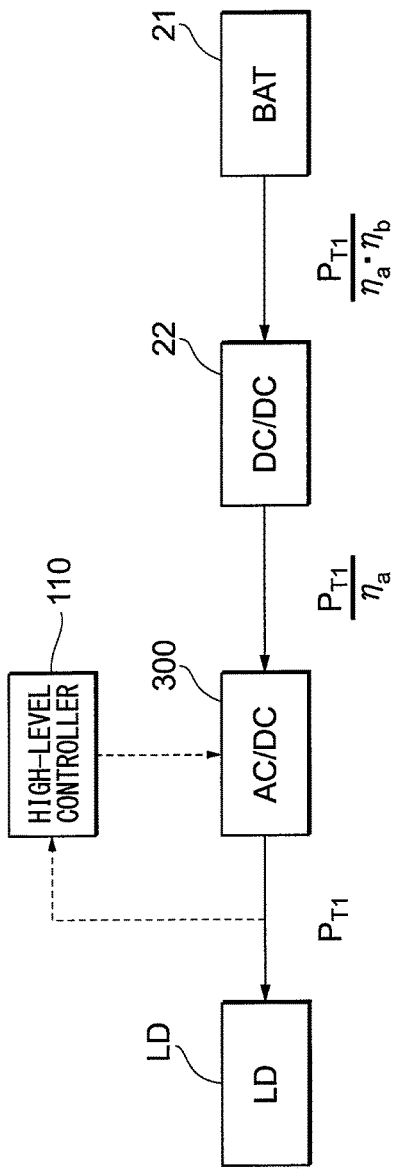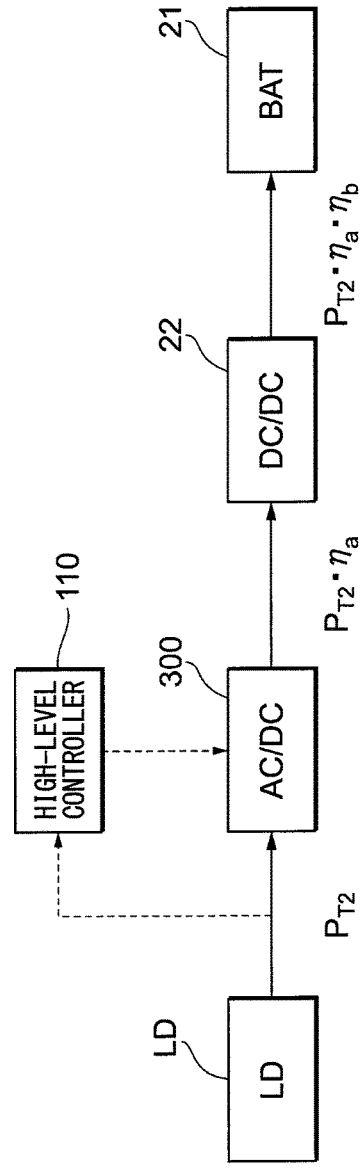
FIG. 4
FIG. 5

STORAGE BATTERY EQUIPMENT

CROSS REFERENCE TO RELATED APPLICATION

The present application is based on Japanese Patent Application No. 2014-208778 filed on Oct. 10, 2014, disclosure of which is incorporated herein by reference.

TECHNICAL FIELD

The present disclosure relates to a storage battery equipment that supplies electric power, which is stored in a storage battery, to a building.

BACKGROUND

Electrical power supplied from an electric power system (e.g., a power grid) to a building fluctuates greatly depending on the operating status of machinery that use electric power (i.e., a load). In this regard, for buildings that consume a large amount of electric power such as factories, a storage battery equipment is often used to level, or reducing the peak of, the electric power supplied from the electric power system (e.g., refer to JP 2014-128063 A).

This type of storage battery equipment stores electric power in a storage battery during relatively low power consumption time bands (e.g., during the night), and supplies power from the storage battery during relatively high power consumption time bands. By using the storage battery equipment, a peak value of the electric power supplied from the electric power system may be kept low, and thus electricity fees paid to power companies may be reduced.

In order to interconnect the power supplied from storage battery equipment with the power supplied from the electric power system, an inverter is included in the storage battery equipment. Specifically, the inverter converts direct current (DC) power extracted from the storage battery into alternating current (AC) power. Further, a converter is included between the storage battery and the inverter. Here, the converter extracts the DC power from the storage battery and converts the voltage of the DC power.

The storage battery equipment includes a controller that controls the overall operation of the storage battery equipment. The controller periodically sets a target value (i.e., an electric power amount) for the electric power that should be supplied from the storage battery equipment to the building, such that the electric power supplied from the electric power system is efficiently leveled. Further, in some cases, this controller may be in the form of a high level controller that is separate from the storage battery equipment.

In a conventional storage battery equipment, the controller controls the converter such that the amount of electric power actually extracted from the storage battery (or if there are multiple storage batteries, the total amount of electric power extracted from each battery) matches the above described target value.

SUMMARY

It is understood that in power converters such as the inverter and the converter, the input power and output power are not precisely matched. Instead, conversion losses occur as a result of power conversion. In other words, if "conversion efficiency" is defined as the output power divided by the input power, it is understood that the conversion efficiency of power converters is a value lower than 1.

In this regard, even when controlling the converter such that the amount of power extracted from the storage battery matches the target value, the actual amount of power supplied to the building is less than the target value, Specifically, the actual amount of power supplied to the building is obtained by multiplying the target value with the conversion efficiency of the converter and then with the conversion efficiency of the inverter.

As a countermeasure to this point, it is contemplated that the amount of power needed for electric power leveling (i.e., the conventional target value) may be divided by each of the conversion efficiencies, and the resulting value, which is greater than the conversional target value, may be set as the target value for the amount of power output from the storage battery.

However, the conversion efficiency of power converters is not a fixed value, and varies based on factors such as the magnitude of the power being output by the power converter (e.g., a load factor), the environment of the power converter (e.g., temperature). For this reason, it is difficult to predict the conversion efficiency in advance and suitably set the target value for the amount of power extracted from the storage battery based on the predicted value. Specifically, there is a concern that if the predicted conversion efficiency deviates from the actual conversion efficiency, the storage battery may deteriorate from excess discharging.

Further, the same problem may occur in the case of charging the storage battery. In order to charge the storage battery with surplus power from the building, a target value for the amount of power that should be charged is set. However, in this case, the amount of power drawn by the storage battery equipment from the building may exceed the surplus power. In other words, although the actual amount of power charged to the storage battery is matched with the target value, the amount of power drawn by the storage battery equipment from the building passes through the inverter and the converter. Thus, the target value is divided by the conversion efficiency of the inverter (i.e., <1) and then divided by the conversion efficiency of the converter (i.e., <1), and the resulting value is greater than the set target value.

In view of these points, it is an object of the present disclosure to provide a storage battery equipment that can accurately supply an amount of electric power needed for electric power leveling for a building.

In view of the above, in one aspect of the present disclosure, there is provided a storage battery equipment for supplying electric power stored in a storage battery to a building, including a converter that extracts direct current power from the storage battery, converts a voltage of the direct current power, and outputs the direct current power, an inverter that converts the direct current power outputted from the converter into an alternating current power, and supplies the alternating current power to the building, and a controller that controls the converter and the inverter. The controller controls the inverter such that an amount of power outputted from the inverter to the building matches a preset target discharge amount.

In other words, according to the present disclosure, the controller of the storage battery equipment does not control the amount of power extracted by the converter from the storage battery to match the target discharge amount. Instead, the controller controls the amount of power output from the inverter to the building to match the target discharge amount. In this regard, the power output from the inverter to the building is used as a control value, and an amount of power substantially equal to the target discharge amount (i.e., the amount of power necessary for leveling) may be supplied to the building.

Thus, the present disclosure provides a storage battery equipment that may accurately supply an amount of power needed for electric power leveling for a building.

BRIEF DESCRIPTION OF THE DRAWINGS

The disclosure, together with additional objectives, features and advantages thereof, will be best understood from the following description, the appended claims and the accompanying drawings, in which:

FIG. 4 is a block diagram showing a magnitude of the power output from various components of the storage battery equipment during discharging;

FIG. 5 is a block diagram showing a magnitude of the power output from various components of the storage battery equipment during charging;

DETAILED DESCRIPTION

Figure 1:
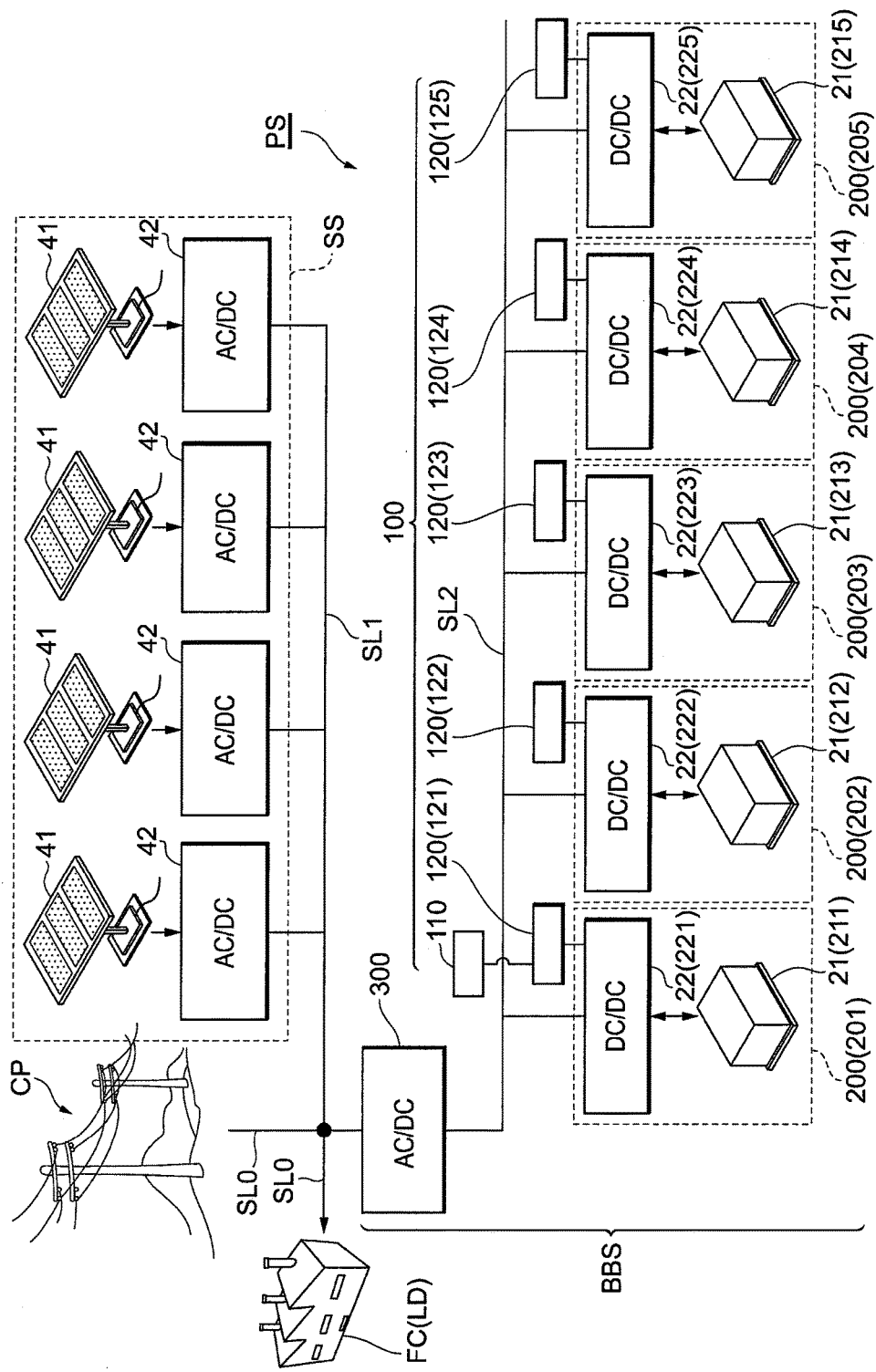
FIG. 1 is a system view of an entire configuration of a power supply system that includes a storage battery equipment according to an embodiment of the present disclosure.

Hereinafter, embodiments of the present disclosure will be explained with reference to the figures. For easy of understanding, components having the same configuration are denoted with the same reference numerals in each figure where appropriate, and redundant explanations thereof are omitted for brevity.

First, a storage battery equipment BS according to an embodiment of the present disclosure will be explained with reference to FIG. 1. The storage battery equipment BS forms a portion of a power supply system PS for supplying electric power to a factory FC.

Further, the factory FC receives power supplied from an electric power system CP which is a commercial power supply. The electric power system CP and the factory FC are connected by a power supply line SL0 which is an AC bus. Specifically, the factory FC is supplied with 3-phase 200V AC power from the electric power system CP through the power supply line SL0. Machinery which uses electric power (i.e., a load) is located in the factory FC, and this machinery primarily operates by receiving power supplied from the electric power system CP. Further, in the following explanation, machinery which uses electric power and is located in the factory FC is collectively referred to as a "load LD".

The power supply system PS is connected to the middle of the power supply line SL0 which connects the electric power system CP with the factory FC. The power supply system PS supplies auxiliary power to the load LD through the power supply line SL0, and curtails electric power supplied from the electric power system PS to the load LD. Here, the power supply system PS includes a solar power system SS and the storage battery equipment BS.

The solar power system SS converts sunlight energy into electric power, and supplies this power to the load LD. Specifically. power from the solar power system SS is supplied to the load LD through a power supply line SL1 and the power supply line SL0. The power supply line SL1 is an AC bus having one terminal connected to the power supply line SL0.

The solar power system SS includes solar panels 41 and inverters 42. The solar panels 41 generates power by converting sunlight energy into DC power. A plurality of the solar panels 41 is installed on a roof of the factory FC.

The inverters 42 are power converters that convert the DC power generated by the solar panels 41 into 3-phase 200V AC power, and supplies this power to the power supply line SL1. One of the inverters 42 is provided for each of the solar panels 41. As shown in FIG. 1, the present embodiment includes four sets of the solar panels 41 and the inverters 42, which are connected in parallel to the power supply line SL1. However, the number of each the solar panels 41 and the inverters 42 is not limited to four, and may be increased or decreased based on the scale of the factor FC and the performance of the solar panels 41.

On clear days, power is supplied from the solar power system SS to the load LD. Accordingly, power supply from the electric power system CP to the load LD is curtailed, and electricity fees paid to power companies may be reduced.

The storage battery equipment BS temporarily stores whatever power supplied from the solar power system SS or the power supply system CP that could not be consumed by the load LD. During time periods of high power consumption by the load LD, the storage battery equipment BS supplies the stored power to the load LD. In this regard, power supplied from the electric power system CP to the load LD may be curtailed.

Power from the storage battery equipment BS is supplied to the load LD through a power supply line SL2 and the power supply line SL0. The power supply line SL2 is a DC bus. Further, the power supply line SL2 is connected to the power supply line SL0 and the power supply line SL1 through a system interconnection inverter (or grid-interconnected inverter) 300 which will be described later.

The storage battery equipment BS includes a controller 100, storage battery units 200, and the system interconnection inverter 300.

The controller 100 is a computer system that controls the operation of the entire storage battery equipment BS. The controller 100 includes one high level controller 110 and five low level controllers 120. As will be explained in detail later, the high level controller 110 is in communication with each of the low level controllers 120 to control the low level controllers 120, and at the same time controls the operation of the system interconnection inverter 300.

Each of the five low level controllers 120 (121, 122, 123, 124, 125) is a system including a CPU, a ROM, a RAM, and an input/output interface. Further, each of the five low level controllers 120 (121, 122, 123, 124, 125) is housed within a housing of a respective one of the storage battery units 200, and controls the operation of their respective storage battery unit 200 based on instructions from the high level controller 110.

The storage battery equipment BS includes five of the storage battery units 200, which are connected in parallel to the power supply line SL2. Each of the storage battery units 200 includes one storage battery 21 and one DC/DC converter 22, which are housed within a single housing to form a unit. Further, the number of the storage battery units 200 (and the number of the low level controllers 120) is not limited to five, and may be increased or decreased based on the scale of the factory FC, the capacity of the storage batteries 21, and the like.

The storage batteries 21 are rechargeable batteries such as lithium-ion batteries or nickel-metal hydride batteries. The DC/DC converters 22 are power converters that upscale the voltage of the DC power generated from the storage batteries 21, and supplies (i.e., discharges) this power to the power supply line SL2. Further, the DC/DC converters 22 include a function of downscaling the voltage of the DC power of the power supply line SL2 and supplying (i.e., charging) this power to the storage batteries 21. In other words, the DC/DC converters 22 connect the power supply line SL2 with the storage batteries 21 and regulate the voltage therebetween.

The system interconnection inverter 300 is a power converter that converts the DC power from the power supply line SL2 into AC power, and supplies this AC power to the power supply line SL0. Further, the system interconnection inverter 300 converts the AC power from the power supply lines SL0, SL1 into DC power, and supplies this DC power to the power supply line SL2. In other words, power may be supplied by the system interconnection inverter 300 in either direction between the power supply line SL2 and the power supply lines SL0, SL1. The operation of the system interconnection inverter 300 is controlled by the high level controller 110.

The specific configuration of the controller 100 will be explained with reference to FIG. 2. The five low level controllers 120 include a low level controller 121. The low level controller 121 is mounted in one of the storage battery units 200 and, naturally, controls the operation of the DC/DC converter 22 mounted in the same storage battery unit 200. Further, the low level controller 121 also controls the operation of the other low level controllers 122, 123, 124, 125. It should be noted that only the low level controller 121 communicates with the high level controller 110. As such, the low level controller 121 functions as a master controller, while the other low level controllers 122, 123, 124, 125 function as slave controllers.

In the following explanation, the storage battery unit 200 in which the low level controller 121 (i.e., the master controller) is mounted in will be referred to as a "storage battery unit 201". Further, the DC/DC converter 22 included in the storage battery unit 201 will be referred to as a "DC/DC converter 221", and the storage battery 21 connected to the DC/DC converter 221 will be referred to as a "storage battery 211".

Similarly, the storage battery unit 200 in which the low level controller 122 (i.e., one of the slave controllers) is mounted will be referred to as a "storage battery unit 202". Further, the DC/DC converter 22 included in the storage battery unit 202 will be referred to as a "DC/DC converter 222", and the storage battery 21 connected to the DC/DC converter 222 will be referred to as a "storage battery 212". The storage battery units 200 for the other low level controllers 123, 124, 125, as well as the DC/DC converters 22 and storage batteries 21 included therein, are referred to in the same manner as above.

Figure 2:
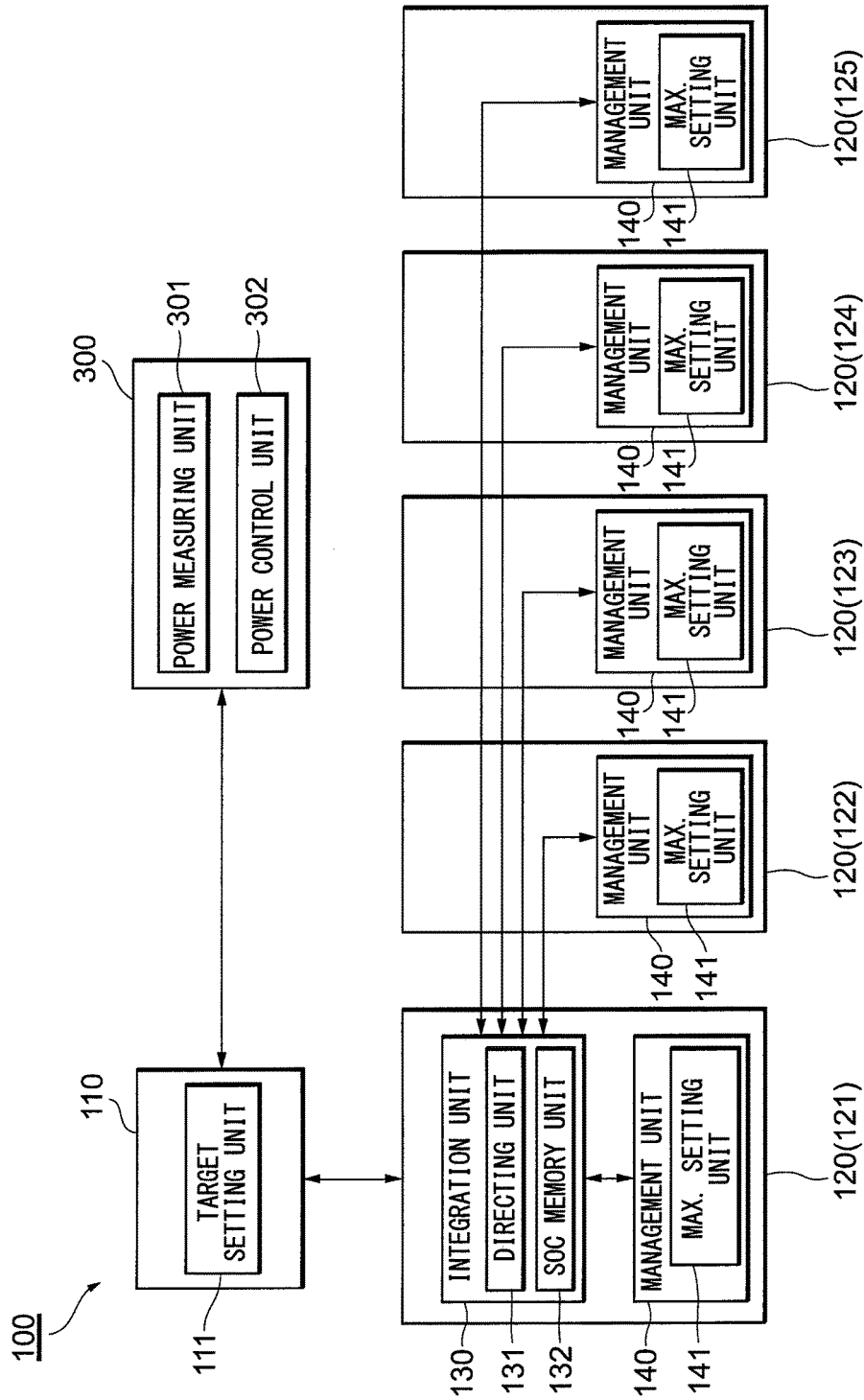
FIG. 2 is a control block diagram showing functional blocks of a controller shown in FIG. 1.

As shown in FIG. 2, the high level controller 110 includes a target setting unit 111, which is a functional control block. The target setting unit 111 sets a target value for the amount of power supplied from the storage battery equipment BS to the load LD, or sets a target value for the amount of power charged to the storage battery equipment BS.

Each time a predetermined calculation period elapses (e.g., every one hour), the target setting unit 111 determines whether the storage battery equipment BS will supply power or be charged with power for the next calculation period. Along with this determination, the target setting unit 111 also sets one of a target value for the amount of power which should be supplied by the storage battery equipment BS to the load LD (hereinafter referred to as a "target discharge amount") and a target value for the amount of power which should be drawn by the storage battery equipment BS from the load LD side (hereafter referred to as a "target charge amount"). In this regard, the target setting unit 111 may be regarded as laying out the plan for the operation of the storage battery equipment BS (i.e., to discharge or to charge).

After the target discharge amount of the target charge amount is set by the target setting unit 111, the high level controller 110 sets a charge/discharge instruction value based on the target charge amount of the target discharge amount. The charge/discharge instruction value is a target value at which the system interconnection inverter 300 should, at the present time, input or output power. The high level controller 110 then sends the charge/discharge instruction value to the system interconnection inverter 300.

The system interconnection inverter 300 includes a power measuring unit 301 and a power control unit 302, which are functional control blocks. The power measuring unit 301 continuously measures a discharge power or a charge power of the system interconnection inverter 300. Here, the discharge power is a value of the power being output from the system interconnection inverter 300 to the load LD side. Similarly, the charge power is a value of the power being supplied from the load LD side to the system interconnection inverter 300. The power measuring unit may be provided by, e.g., an electric power sensor. The discharge power or the charge power measured by the power measuring unit 301 is transmitted to the high level controller 110.

When the system interconnection inverter 300 is discharging power, the power control unit 302 controls the operation of the system interconnection inverter 300 such that the instant power being supplied (or discharged) to the load LD matches the charge/discharge instruction value sent from the high level controller 110. Further, when the system interconnection inverter 300 is charging power, the power control unit 302 controls the operation of the system interconnection inverter 300 such that the instant power being supplied (or charged) to the storage battery equipment BS matches the charge/discharge instruction value sent from the high level controller 110.

The low level controller 121 includes an integration unit 130 and a management unit 140, which are functional control blocks. The management unit 140 of the low level controller 121 is a control block that controls the operation of the DC/DC converter 221, and manages the input/output power of the storage battery 211. Specifically, the management unit 140 continuously calculates and stores a state of charge (SOC) of the storage battery 211 based on a voltage between the output terminals of the storage battery 211 and an integrated value of the power discharged and charged by the storage battery 211 (i.e., coulomb counting). Further, the management unit 140 continuously monitors whether the storage battery 211 is operating normally (e.g., whether a portion of the cells are degraded, etc.).

Further, the management unit 140 of the low level controller 121 includes a maximum setting unit 141. The maximum setting unit 141 is a control block that stores a maximum (or upper limit) value for the power discharged or charged through the DC/DC converter 221. Typically, this maximum value is set as the highest value (i.e., rated value)

of power that may be output by the storage battery 211, and is stored in the maximum setting unit 141.

If the SOC of the storage battery 211 is near 0% during a discharge operation, the maximum value is set to zero and stored in the maximum setting unit 141. Further, if the SOC of the storage battery 211 is near 100% (i.e., fully charged) during a charge operation, the maximum value is set to zero and stored in the maximum setting unit 141.

The management unit 140 controls the operation of the DC/DC converter 221 such that the value of the power passing through the DC/DC converter 221 settles below the maximum value stored in the maximum setting unit 141. However, in the present embodiment, the magnitude of the power passing through the DC/DC inverter 221 is not controlled to match a predetermined target value. Instead, as will be explained later, the management unit 140 merely controls the direction of the power passing through the DC/DC converter 221 (i.e., charging or discharging).

The integration unit 130 is a control block that communicates with, and controls the operation of, the management units 140 of each of the low level controllers 121, 122, 123, 124, 125. Further, the integration unit 130 includes a directing unit 131 and an SOC memory unit 132, which will be explained later.

The low level controller 122 does not include an integration unit 130 as described above, and instead only includes a management unit 140 (as well as a maximum setting unit 141) which is a functional control block. The management unit 140 of the low level controller 122 functions in the same manner as that of the low level controller 121, and controls the operation of the DC/DC converter 222 and manages the input/output levels of the storage battery 212. The other low level controllers 123, 124, 125 are configured in the same manner, and include respective management units 140 and maximum setting units 141, which are also functional control blocks.

The control process of the controller 100 will be explained with reference to FIGS. 1 to 3. As explained previously, each time the calculation period (e.g., one hour) elapses, the controller 100 determines whether charging or discharging will be performed during the next calculation period. In addition, the controller 100 sets the target discharge amount or the target charge amount for use during the next calculation period.

Figure 3:
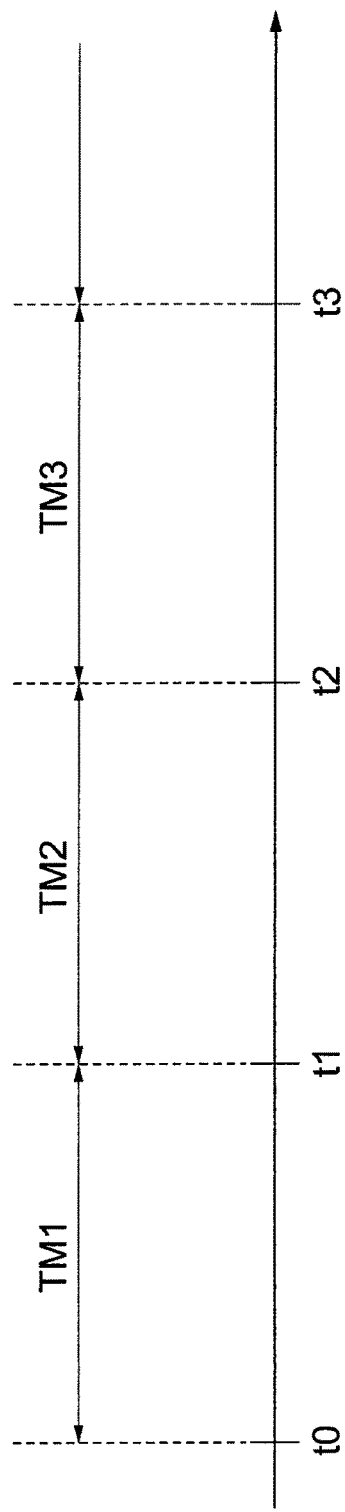
FIG. 3 is a diagram showing a method of updating a target value for an amount of power output from the storage battery equipment.

FIG. 3 shows a case where a calculation period TM1 (of one hour) is defined between a time t0 and a time t1, a calculation period TM2 (of one hour) is defined between the time t1 and a time t2, and a calculation period TM3 (of one hour) is defined between the time t2 and a time t3. In this case, at the time t1, which is when the calculation period TM1 ends, the target setting unit 111 of the high level controller 110 determines whether charging or discharging will be performed during the next calculation period TM2.

For this determination, the power supplied from the electric power system CP to the load LD is leveled as much as possible based on changes in the power consumed by the load LD during the period up to the time t1, the time band of the calculation period TM2 (e.g., night, noon, etc.), and an estimated amount of power to be consumed by the load LD during the calculation period TM2.

After the target setting unit 111 performs this determination, the target setting unit 111 communicates to the integration unit 130 of the low level controller 121 whether discharging or charging will be performed during the calculation period TM2. The low level controller 121 then stores this determination result in the directing unit 131. For example, if discharging will be performed during the calculation period TM2, a "0", which indicates discharging, is stored in the directing unit 131. If charging will be performed during the calculation period TM2, a "1", which indicates charging, is stored in the directing unit 131.

Further, at the time t1, the target setting unit 111 of the high level controller 110 determines the target discharge amount or the target charge amount for the next calculation period TM2. Specifically, this determination is performed based on the total amount of power stored in each of the storage batteries 21, or the total amount of power that may be charged to each of the storage batteries 21.

Further, the integration unit 130 continuously communicates with each of the management units 140, and thus is aware of the situation of each of the storage batteries 21. Specifically, the amount of power stored in each of the storage batteries 21 is communicated to the integration unit 130, and the total value thereof is stored in the SOC memory unit 132. Similarly, the amount of power that may be charged to each of the storage batteries 21 is communicated to the integration unit 130, and the total value thereof is stored in the SOC memory unit 132. The information stored in the SOC memory unit 132 is transmitted to the high level controller 110, and this information is used for the above described determination of the target discharge amount or the target charge amount.

If discharging is performed during the calculation period TM2, the high level controller 110 sends the charge/discharge instruction value to the system interconnection inverter 300 such that the amount of power supplied from the system interconnection inverter 300 to the load LD matches the target discharge amount set by the target setting unit 111. Here, the charge/discharge instruction value may be, for example, a value (of power, in Watts) obtained by dividing the target discharge amount by the length of the calculation period TM2. Then, the system interconnection inverter 300 operates so that the discharge power measured by the power measuring unit 301 matches the charge/discharge instruction value. In this case, the system interconnection inverter 300 draws power from the power supply line SL2 so as to output a power equal to the charge/discharge instruction value to the load LD side.

Due to the system interconnection inverter 300 drawing power, the voltage of the power supply line SL2 decreases. As a result, the power supplied by each of the DC/DC converter 22 to the power supply line SL2 is increased. As explained previously, the management units 140 do not control the magnitude of the power output by the DC/DC converters 22.

Instead, the management units 140 only control the directionality of the power passing through the DC/DC converters 22 to match the direction stored in the directing unit 131, while ensuring that the magnitude of this power does not exceed the maximum value. In practice, the magnitude of the power supplied from the DC/DC converters 22 to the power supply line SL2 varies according to the voltage of the power supply line SL2, i.e., as the operation of system interconnection inverter 300 progresses.

The same applies if charging is performed during the calculation period TM2. In this case, the high level controller 110 controls the operation of the system interconnection inverter 300 such that the amount of power supplied from the load LD side (i.e., from the power supply system CP or the solar power system SS) to the system interconnection inverter 300 matches the target charge amount set by the target setting unit 111. Here, the charge/discharge instruction value may be, for example, a value (of power, in Watts) obtained by dividing the target charge amount by the length of the calculation period TM2, and is sent from the high level controller 110 to the system interconnection inverter 300. Then, the system interconnection inverter 300 operates so that the charge power measured by the power measuring unit 301 matches the charge/discharge instruction value. In this case, the system interconnection inverter 300 draws power equal to the charge/discharge instruction value from the load LD side so as to output a power to the power supply line SL2.

Due to the system interconnection inverter 300 supplying power, the voltage of the power supply line SL2 increases. As a result, the power output by each of the DC/DC converters 22 to the storage batteries 21 increases. In this case as well, the management units 140 only control the directionality of the power passing through the DC/DC converters 22 to match the direction stored in the directing unit 131, while ensuring that the magnitude of this power does not exceed the maximum value. In practice, the magnitude of the power drawn by the DC/DC converters 22 from the power supply line SL2 varies according to the voltage of the power supply line SL2, i.e., as the operation of the system interconnection inverter 300 progresses.

The magnitude of the power output from the various components of the storage battery equipment BS (such as the DC/DC converters 22) during discharging will be explained with reference to FIG. 4. In the following explanation, a target value obtained from dividing the target discharge amount by the length of the calculation period is referred to as a "target power $P_{T1}$". The high level controller 110 sends the target power $P_{T1}$ (i.e., the charge/discharge instruction value) to the system interconnection inverter 300. The power control unit 302 of the system interconnection inverter 300 controls the operation of the system interconnection inverter 300 such that the power output from the system interconnection inverter 300 to the load LD matches the target power $P_{T1}$.

In this case, the power drawn from the power supply line SL2 to the system interconnection inverter 300 (i.e., the total power supplied from each of the DC/DC converters 22 to the system interconnection inverter 300) does not match the target power $P_{T1}$. A conversion efficiency $\eta_a$ of the system interconnection inverter 300 is less than 1. Accordingly, the total power drawn from the power supply line SL2 to the system interconnection inverter 300 is a value greater than $P_{T1}$, i.e., $P_{T1}/\eta_a$.

Further, the total power output by each of the storage batteries 21 to the DC/DC converters 22 does not match $P_{T1}/\eta_a$. A conversion efficiency $\eta_b$ of the DC/DC converters 22 is less than 1. Accordingly, the total power output by each of the storage batteries 21 to the DC/DC converters 22 is a value even greater than $P_{T1}/\eta_a$, i.e., $P_{T1}/\eta_a\eta_b$.

In this regard, the amount of power extracted from the storage batteries 21 over the calculation period is greater than the target discharge amount. As a result, the discharging process may attempt to extract more power than the amount stored in the storage batteries 21, i.e., so-called "excess discharging".

However, the target discharge amount set at the beginning of the calculation period (i.e., t1 of TM2) may be set based on the actual stored amount of power at that time (i.e., the value stored in the SOC memory unit 132), with a margin such that excess discharging does not occur. As a result, excess discharging may be reliably prevented.

The magnitude of the power output from the various components of the storage battery equipment BS (such as the DC/DC converters 22) during charging will be explained with reference to FIG. 5. In the following explanation, a target value obtained from dividing the target charge amount by the length of the calculation period is referred to as a "target power $P_{T2}$". The high level controller 110 sends the target power $P_{T2}$ (i.e., the charge/discharge instruction value) to the system interconnection inverter 300. The power control unit 302 of the system interconnection inverter 300 controls the operation of the system interconnection inverter 300 such that the power supplied from the load LD side (i.e., the power supply system CP or the solar system SS) to the system interconnection inverter 300 matches the target power $P_{T2}$.

In this case, the power output to the power supply line SL2 from the system interconnection inverter 300 (i.e., the total power supplied from the system interconnection inverter 300 to each of the DC/DC converters 22) does not match the target power $P_{T2}$. The conversion efficiency $\eta_a$ of the system interconnection inverter 300 is less than 1. Accordingly, the power output to the power supply line SL2 from the system interconnection inverter 300 is a value smaller than $P_{T2}$, i.e., $P_{T2}*\eta_a$.

Further, the total power output by each of the DC/DC converters 22 to the storage batteries 21 does not match $P_{T2}*\eta_a$. The conversion efficiency $\eta_b$ of the DC/DC converters 22 is less than 1. Accordingly, the total power output by each of the DC/DC converters 22 to the storage batteries 21 is a value even smaller than $P_{T2}*\eta_a$, i.e., $P_{T2}*\eta_a\eta_b$.

As described above, according to the storage battery equipment BS of the present embodiment, the total amount of power extracted from the storage batteries by the DC/DC converters 22 is not matched to the target discharge amount. Instead, the amount of power output from the system interconnection inverter 300 to the load LD side is matched to the target discharge amount. By using the power output from the system interconnection inverter 300 to the load LD side as the control value, the effects of the conversion efficiencies $\eta_a$, $\eta_b$ are avoided, and a power that is substantially equal to the target discharge amount (i.e., the amount of power necessary for leveling) may be supplied to the load LD.

The same applies to charging. According to the storage battery equipment BS, the total amount of power supplied from the DC/DC converter 22 to the storage batteries 21 is not matched to the target charge amount. Instead, the amount of power supplied from the load LD side to the system interconnection inverter 300 is matched to the target charge amount. By using the power output from the load LD side to the system interconnection inverter 300 as the control value, the effects of the conversion efficiencies $\eta_a$, $\eta_b$ are avoided, and a power that is substantially equal to the target charge amount (i.e., the amount of power necessary for electric power leveling) may be supplied from the load LD side to the storage battery equipment BS.

Figure 6:
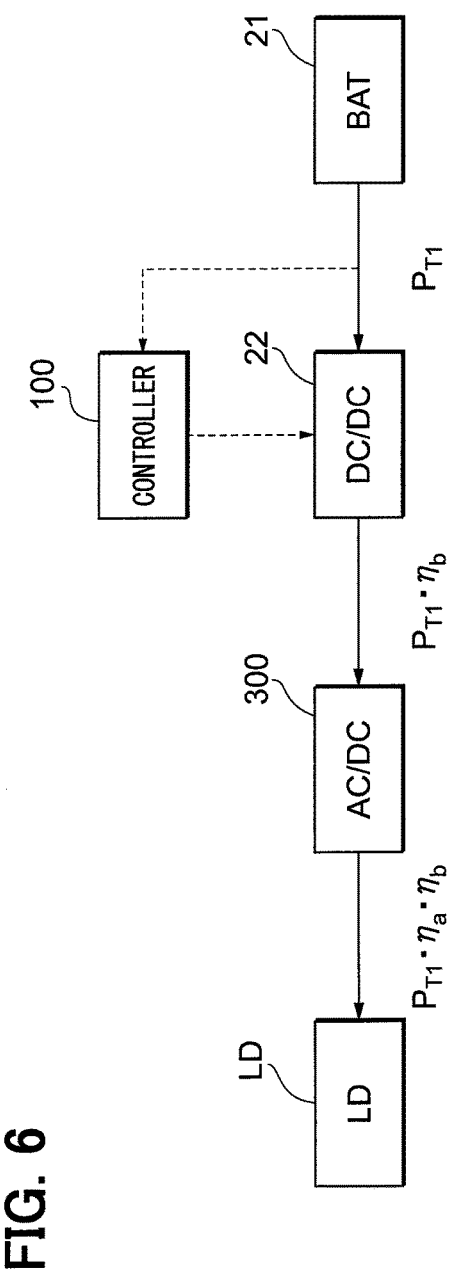
FIG. 6 is a block diagram showing a magnitude of the power output from various components of a storage battery equipment of a reference example during discharging.

As a comparative example to the present disclosure, the magnitude of the power output from the various components of a reference example storage battery equipment during discharging will be explained with reference to FIG. 6. According to the storage battery equipment of the reference example, the total amount of power extracted by each of the DC/DC converters 22 from the storage batteries 21 is used by the controller 100 as the control value. In other words, each of the DC/DC converters 22 is controlled such that the total amount of power extracted by the DC/DC converters 22 from the storage batteries 21 matches the target power $P_{T1}$.

In this case, the power drawn from the power supply line SL2 to the system interconnection inverter 300 (i.e., the total power supplied from each of the DC/DC converters 22 to the system interconnection inverter 300) does not match the target power $P_{T1}$. The conversion efficiency $\eta_b$ of the DC/DC converters 22 is less than 1. Accordingly, the total power drawn from the power supply line SL2 to the system interconnection inverter 300 is a value smaller than $P_{T1}$, i.e., $P_{T1}*\eta_b$.

Further, the total power output by the system interconnection inverter 300 to the load LD does not match $P_{T1}/\eta_b$. The conversion efficiency $\eta_a$ of the system interconnection inverter 300 is less than 1. Accordingly, the total power output by the system interconnection inverter 300 to the load LD is a value even less than $P_{T1}*\eta_b$, i.e., $P_{T1}*\eta_a\eta_b$.

For this reason, the amount of power supplied from the storage battery equipment to the load LD during the calculation period is smaller than the target discharge amount. As a result, the power supplied from the power supply system CP to the load LD is not sufficiently leveled. In contrast, according to the storage battery equipment BS of the present embodiment, the amount of power supplied to the load LD is substantially equal to the target discharge amount as explained above. Accordingly, the power supplied from the power supply system CP to the load LD is sufficiently leveled as initially planned.

Figure 7:
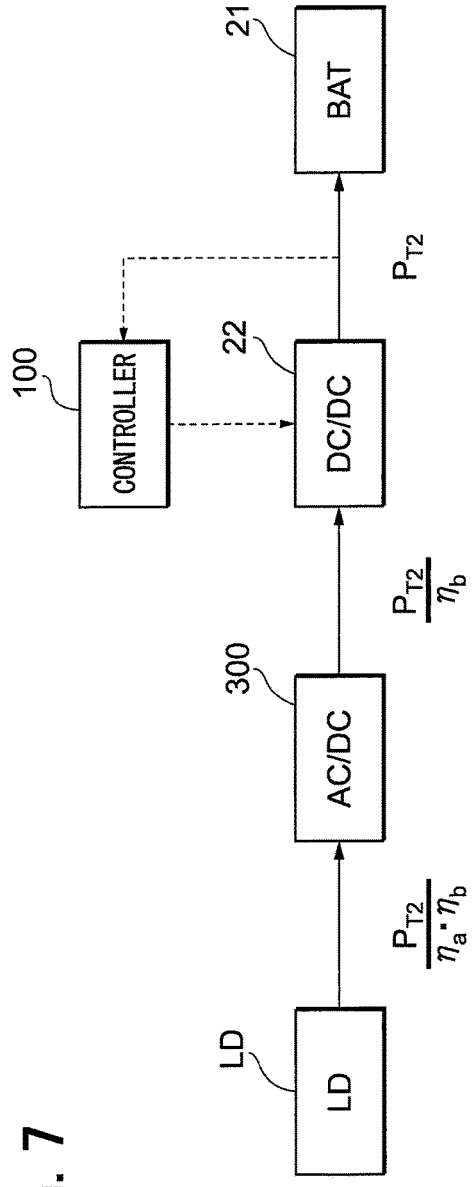
FIG. 7 is a block diagram showing a magnitude of the power output from various components of a storage battery equipment of a reference example during charging.

In addition to discharge, the same applies to charging. The magnitude of the power output from the various components of the reference example storage battery equipment during charging will be explained with reference to FIG. 7. According to the storage battery equipment of the reference example, the total amount of power supplied from each of the DC/DC converters 22 to the storage batteries 21 is used by the controller 100 as the control value. In other words, each of the DC/DC converters 22 is controlled such that the total amount of power supplied from the DC/DC converters 22 to the storage batteries 21 matches the target power $P_{T2}$.

In this case, the power supplied from the system interconnection inverter 300 to the power supply line SL2 (i.e., the total power supplied from the system interconnection inverter 300 to each of the DC/DC converters 22) does not match the target power $P_{T2}$. The conversion efficiency $\eta_b$ of the DC/DC converters 22 is less than 1. Accordingly, the total power supplied from the system interconnection inverter 300 to the power supply line SL2 is a value greater than $P_{T2}$, i.e., $P_{T2}/\eta_b$.

Further, the power supplied from the load LD side (i.e., from the power supply system CP or the solar power system SS) to the system interconnection inverter 300 does not match $P_{T2}/\eta_b$. The conversion efficiency $\eta_a$ of the system interconnection inverter 300 is less than 1. Accordingly, the power supplied from the load LD side to the system interconnection inverter 300 is a value even greater than $P_{T2}/\eta_b$, i.e., $P_{T2}/\eta_a\eta_b$.

For this reason, the amount of power drawn by the storage battery equipment from the load LD side during the calculation period is greater than the target charge amount. As a result, the power supplied from the power supply system CP to the load LD is not sufficiently leveled. In contrast, according to the storage battery equipment BS of the present embodiment, the amount of power drawn by the storage battery equipment BS from the load LD side is substantially equal to the target charge amount as explained above. Accordingly, the power supplied from the power supply system CP to the load LD is sufficiently leveled as initially planned.

Further, in the present embodiment, a plurality of the storage battery units 200 are included. In other words, an example is provided where a plurality of sets of the storage batteries 21 and the DC/DC converters 22 are included. However, the present embodiment of the present disclosure is not limited to such a configuration. Instead, even if only one storage battery unit 200 is provided, the present disclosure may still be applied.

However, by including a plurality of the storage battery units 200 as in the present embodiment, the number of storage battery units 200 may be increased or decreased according to the scale of the factory FC (i.e., the power usage amount of the load LD). In other words, the storage battery equipment BS of the present disclosure is highly scalable and may be applied to a variety of scales of buildings without needing to prepare storage batteries having different storage capacities beforehand.

Further, in the present embodiment, the controller 100 is divided into the high level controller 110 and the low level controllers 120. Further, the storage batteries 21 and the DC/DC converters 22 are controlled by only the low level controllers 120.

In other words, control of power outputted to the load LD or drawn from the load LD is exclusively performed by the high level controller 110, and detailed control based on the status of each of the storage batteries 21 (by considering the stored amount of power, any deteriorated cells, etc.) is performed by the low level controllers 120. As a result, the two types of controls may easily coexist and avoid difficulties caused by intertwining the two types of controls.

Embodiments of the present disclosure are explained with reference to specific examples above. However, the present disclosure is not limited to these specific examples. In other words, a skilled artisan may suitable alter these specific examples without departing from the gist of the present disclosure. For example, the arrangement, material, requirements, sizes, shapes, etc. of the components of the each specific example may be suitable altered by a skilled artisan. Moreover, the components of each embodiment may be combined in any technically feasible manner that does not depart from the gist of the present disclosure.

The invention claimed is:

1. A storage battery equipment for supplying electric power stored in a plurality of storage batteries to a building, comprising:
a plurality of converters that extract direct current power from the storage batteries, convert a voltage of the direct current power, and output the direct current power;
an inverter that converts the direct current power outputted from the converters into an alternating current power, and supplies the alternating current power to the building; and
a controller that includes:
a high level controller that controls the inverter such that an amount of power outputted from the inverter to the building matches a preset target discharge amount, and
a plurality of low level controllers that control operation of the converters, the low level controllers corresponding to respective ones of the storage batteries, wherein
the low level controllers are configured to control the converters by managing a directionality of power passing through the converters, without controlling a value of power passing through the converters to match a particular target value,
one of the lower level controllers is a master controller, and
only the master controller among the lower level controllers is configured to communicate with the high level controller.

2. The storage battery equipment of claim 1, wherein
the controller sets the target discharge amount each time a predetermined calculation period elapses, and
the controller sets a subsequent one of the target discharge amount based on an amount of power stored in the storage battery when the predetermined calculation period elapses.

3. The storage battery equipment of claim 1, wherein
the inverter is configured to receive power from an external source, and
the controller controls the inverter during a charging operation, in which the power received from the external source is used to charge the storage battery, such that an amount of power drawn by the inverter from the external source matches a preset target charge amount.

4. The storage battery equipment of claim 3, wherein
the controller sets the target charge amount each time a predetermined calculation period elapses, and
the controller sets a subsequent one of the target charge amount based on an amount of power stored in the storage battery when the predetermined calculation period elapses.

5. The storage battery equipment of claim 1, wherein
the storage battery and the converter include a plurality of sets of storage batteries and converters.

\* \* \* \* \*